Dec. 5, 1961 G. M. SLOCOMB ET AL 3,012,195
PEAK-READING DIGITAL VOLTMETER
Filed May 19, 1958
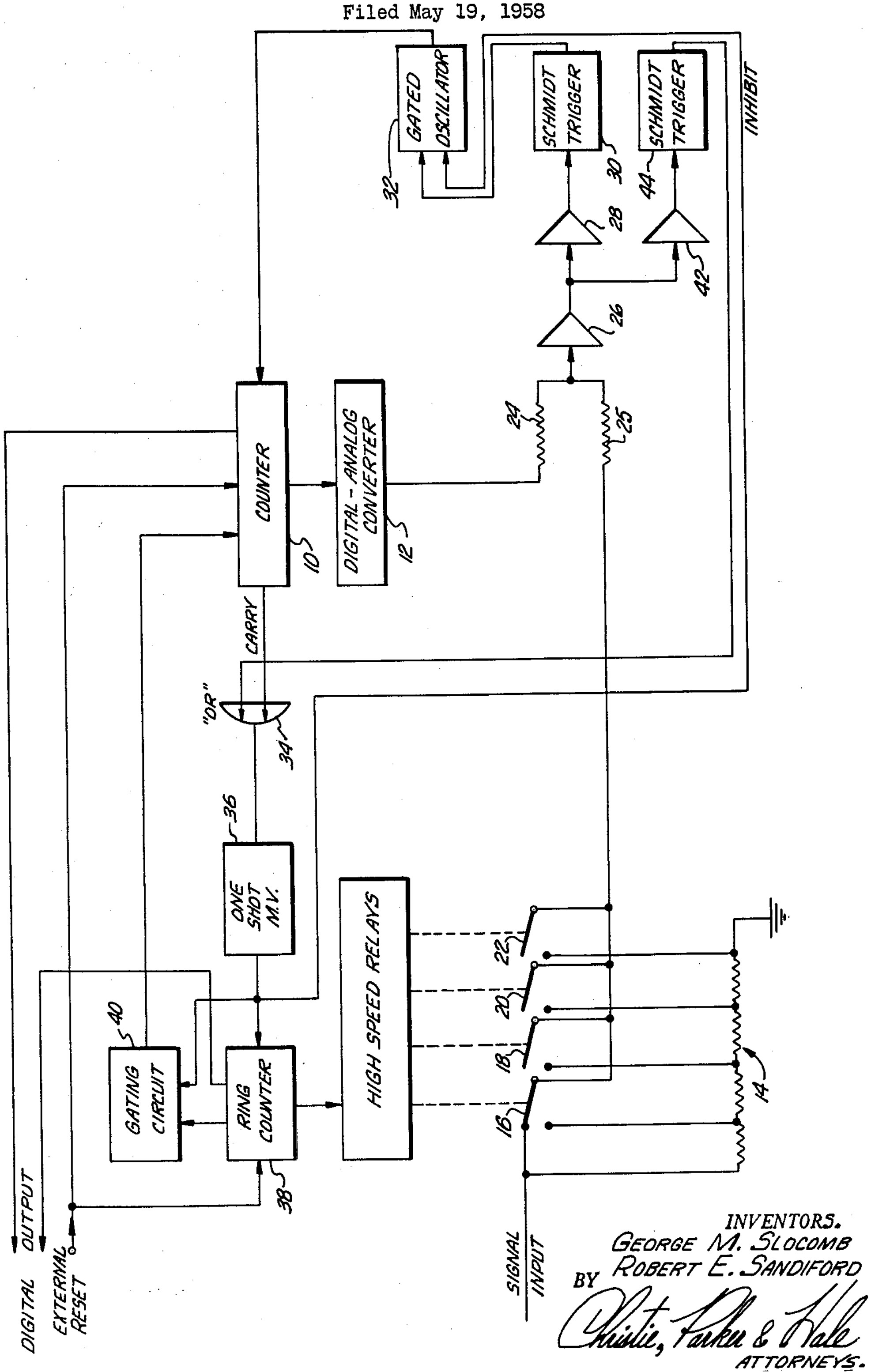
INVENTORS.
GEORGE M. SLOCOMB
ROBERT E. SANDIFORD
BY Christie, Parker & Hale
ATTORNEYS.

United States Patent Office 3,012,195
Patented Dec. 5, 1961

3,012,195

PEAK-READING DIGITAL VOLTMETER

George M. Slocomb, Altadena, and Robert E. Sandiford, Arcadia, Calif., assignors, by mesne assignments, to Consolidated Electrodynamics Corporation, Pasadena, Calif., a corporation of California Filed May 19, 1958, Ser. No. 736,333
9 Claims. (Cl. 324—103)

This invention relates to digital voltmeters, and more particularly, is concerned with a circuit for indicating the magnitude of voltage peaks in digitized form.

In the operation of mass spectrometers and other types of analytical equipment, for example, it is necessary to measure accurately the peak amplitude of signals which vary over a wide dynamic range. While voltmeters are known to the art which digitize their output readings, such known digitizing voltmeters are generally not capable of operating over the wide dynamic range required in measuring amplitude peaks of a mass spectrometer or other type of analytical instrument. Moreover, the prior art digitizing voltmeters are not capable of measuring the peak amplitude of a single pulse, but generally require an analog voltage to be developed by averaging a number of peaks and then digitizing the stored analog information.

The present invention provides a digitizing voltmeter for converting voltage peaks with a wide dynamic range of amplitudes to digital form without the sensing and storing of the peak-amplitude in analog form. Nor does the present circuit require a precise recognition of the time of occurrence of the peak to make its measurement.

In brief, the advantages of the present invention are achieved by a peak-reading digital voltmeter comprising an electronic counter which controls a digital-to-analog converter. The output of the converter is compared with the input signal and the counter caused to advance whenever the input signal is greater in magnitude than the output of the converter. If the input voltage is within the range of the converter output voltage, the counter advances as the input voltage rises but does not change its condition after the input voltage passes its peak amplitude and begins to fall. The counter then provides, in digital form, an accurate indication of the peak amplitude of the input signal.

The peak digitizer further includes an automatic ranging circuit which is activated whenever the counter reaches its maximum count, so as to generate an overflow or carry signal. The carry signal stops the counting of the counter for a delayed interval and introduces a fixed amount of attenuation in the input signal. It also acts to preset the counter to a number proportional to the change in attenuation.

The peak digitizer also includes an anticipator circuit which senses when the input signal exceeds the output from the converter by an amount greater than the attenuation introduced by the next step of the attenuation on the input. In such case, the anticipator circuit immediately actuates the automatic ranging circuit to set the attenuator to the next attenuation step.

For a more complete understanding of the invention, reference should be had to the accompanying drawing, wherein:

The single figure is a block diagram of the peak-reading digital voltmeter according to the present invention.

Referring to the drawing in detail, the numeral 10 indicates generally an electronic counter which may be of any suitable type capable of counting input pulses, preferably up to 999 in number and producing a carry pulse when the counter exceeds this number and starts recounting from zero. The counter 10 may operate on any suitable code such as straight binary or binary-coded decimal, or decimal. For example, the counter 10 may comprise three binary-coded decimal counters, one for each digit of a three-digit number, such as described on page 400 of the book "Digital Computer Components and Circuits" by R. K. Richards, D. Van Nostrand Co., 1957. Such a counter comprises a chain of flip-flops which store the binary-coded digital information.

A digital-to-analog converter 12 senses the condition of the flip-flops in the counter 10 and develops a corresponding analog voltage at the output. Thus the output of the converter 12 will be different for each of the one thousand different count conditions stored in the counter 10. A suitable converter circuit is described in Patent No. 2,736,889. The output from the converter 12 is compared with the input signal for producing a voltage equal to the difference between the two. Before the comparison is made, the input signal is applied through a step attenuator indicated generally at 14, the taps on the attenuator being connected to the output by one of a group of relay-actuated swiches 16, 18, 20, and 22.

The circuit for making the comparison between the output of the attenuator 14 and the output of the converter 12 may take a variety of forms, such as a differential amplifier, or, as specifically shown in the figure, a summing network comprising resistors 24 and 25 which sum the two input signals, applying the sum to a high gain D.C. amplifier 26. To use the summing network shown, the analog signals from the attenuator 14 and the converter 12 must be opposite in polarity in order to sum to zero when they are equal.

If the attenuated input signal and the signal from the converter 12 are unequal in magnitude, the difference is amplified by the amplifier 26 and amplified further by a direct-coupled amplifier 28, and applied to the input of a Schmidt trigger circuit 30. The Schmidt trigger is a conventional circuit which assumes one of two stable states as the level of an applied D.C. signal varies above and below a predetermined level. The Schmidt trigger circuit 30 is biased so that when the output of the converter 12 increases to the magnitude of the input signal, the trigger circuit 30 is actuated to change its stable condition.

The Schmidt trigger controls a gated oscillator 32 which may, for example, be a free-running multivibrator. The Schmidt trigger 30, for example, normally biases the oscillator to a free-running condition, but biases it to a non-freerunning condition when the Schmidt trigger 30 is triggered in response to an increase in the output of the converter 12 to the level of the input signal. The output of the gated oscillator 32 normally pulses the counter 10.

Thus it will be seen that whenever the input signal exceeds the output of the converter 12 in magnitude, the oscillator 32 is gated on and begins to count the counter 10, thus increasing the output from the converter 12. When the counter 10 reaches a count condition in which the output of the converter 12 is equal to the input signal, the Schmidt trigger 30 is actuated, gating off the oscillator 32 and preventing further counting of the counter 10. The counter 10 remains at its count condition as long as the input signal remains equal to or less than the level of the output of the converter 12. The converter 12 then provides an indication of the peak-amplitude to which the input signal rises.

With the counter 10 counted to its maximum count condition, if the output of the converter 12 is still less than the magnitude of the input signal, a carry pulse is produced by the counter 10. This is coupled through a logical OR circuit 34 to a monostable or one-shot multivibrator 36. The multivibrator 36 produces a pulse which steps a ring counter 38 to its next count condition. For all but the initial count condition of the ring counter 38, one of a plurality of highspeed relays is energized to control one of the relay-operated switches 16–22. The ring counter 38 is initially set so that none of the relays is energized and therefore the input signal is not attenuated.

The first carry pulse from the counter 10 shifts the ring counter to its next count condition, thereby energizing a relay for operating the switch 16, producing the first attenuation step of the attenuator 14. This reduces the magnitude of the input signal by a predetermined amount. Preferably the switch 16 when actuated, attenuates the signal in the ratio of 3 to 1, the switch 18 attenuates the signal in the ratio of 10 to 1, the switch 20 attenuates the input signal in the ratio of 30 to 1, and the switch 22 attenuates the signal in the ratio of 100 to 1.

The output of the one-shot multivibrator 36 is also applied to the gated oscillator 32 to inhibit counting of the counter 10 during the time the ring counter is shifted and the attenuator relay is being actuated. Once the delay interval established by the multivibrator 36 is over, the oscillator 32 begins to count the counter 10 again. A comparison between the output of the converter 12 and the attenuated version of the input signal is now made, and the counter is counted up until a balance is indicated by the summing resistors 24 and 25. If no balance is achieved, the process is repeated by the carry pulse from the counter 10 stepping the ring counter to the next count condition.

One feature of the present invention is the presetting of the counter 10, depending upon the step condition of the attenuator 14. It is evident that if a 3-to-1 attenuation ratio is introduced by the stepping of the attenuator 14 in reducing the level of the input signal being compared, the counter 10 must be counted up to a count of 333 before the output from the converter 12 reaches the minimum possible level of the attenuated input. Since the counter 10 must at least count up to this level before equality can be achieved between the output of the attenuator and the output of the converter 12, a preset gating circuit, indicated generally at 40, is provided for presetting the counter 10. Gating circuit 40 is controlled by the ring counter 38. The circuit 40 is arranged to preset the counter to 333 or 300, depending upon whether a 3-to-1 step in attenuation is provided or a 3-to-10 ratio attenuation step is provided in the particular setting of the ring counter 38. The gating circuit 40 may comprise a plurality of AND gates which are set in response to the condition of the ring counter 38 to pass a pulse from the multivibrator 36 to the various flip-flops in the counter 10. In this way, for each condition of the ring counter 38, the pulse from the multivibrator 36 sets the flip-flops in the counter 10 to either a zero, a 300, or a 333 condition. The design of gating circuits for controlling the flip-flops in binary counters to establish any predetermined count condition is well known in the art.

Another feature of the present invention is the provision of an anticipator circuit which accelerates the stepping of the attenuator 14 in response to large input signals. To this end, the output from the amplifier 26 is applied through an amplifier 42 to a second Schmidt trigger circuit 44. The Schmidt trigger circuit 44 is biased such that when the input signal as applied to the summing resistor 25 exceeds the level of the signal derived from the converter 12 by the ratio of 3 to 1 or more, the resulting voltage level at the output of the amplifier 42 is such as to drive the trigger circuit 44 to its opposite stable condition. This produces a pulse which is passed by the OR circuit 34 to the one-shot multivibrator 36 for stepping the ring counter 38 to its next count condition. Thus the circuit anticipates the fact that even if the counter 10 is set to its maximum count condition for a given setting of the attenuator 14, the output of the amplifier 26 will not be reduced to zero. Sensing this fact, the anticipator circuit immediately steps the attenuator rather than waiting for the counter 10 to produce a carry pulse.

From the above description it will be recognized that a circuit is provided for digitizing voltage peaks of an input signal. The digitized results are obtained from the counters 10 and 38, the counter 38 providing a scale indication, and the counter 10 providing the fine reading. The digital information derived from the ring counter 38 and the pulse counter 10 may be applied to a suitable recording device, such as a highspeed printer, a punch card machine, or other suitable output device for presenting the digitized information. To take a new reading, an external reset pulse may be provided which is applied to the counters 10 and 38 to reset them to their initial operating condition.

The automatic ranging circuit with its preset operation provides a fast scale change and reduces the time that otherwise would be required to step the counter 10 to produce a converter voltage equal the input. By reducing the scale change time to a minimum, the chance that the input may have passed its peak during the time the circuit is changing scales is greatly reduced. As a result, the possible error in peak measurement is also substantially reduced. The anticipator circuit also reduces the response time of the peak digitizer by reducing the lag in the counter for large amplitude input signals.

What is claimed is:

1. A peak-reading digital voltmeter for indicating the peak amplitude of an input signal comprising a counter producing a carry output signal when the counter exceeds its maximum count, a digital-to-analog converter coupled to the counter, an amplitude comparator coupled to the output of the converter, step-attenuator means coupling the input signal to the comparator, a gated oscillator coupled to the counter for stepping the counter, the gated oscillator being coupled to the output of the comparator circuit, the oscillator being gated on by the comparator whenever the signal amplitude derived from the step-attenuator is greater than the signal amplitude from the converter and gated off by the comparator when the signal amplitude derived from the step-attenuator is smaller than the signal amplitude from the converter, a ring counter, means for advancing the ring counter in response to the carry output from the counter, relay means for setting the step-attenuator to a predetermined attenuation setting for each setting of the ring counter, means responsive to the setting of the ring counter for pre-setting the counter to a selected count condition following the generation of a carry signal, and means responsive to the output of the amplitude comparator for advancing the setting of the ring counter when the output of the step-attenuator exceeds the output of the converter by an amount greater than the attenuation produced by the advancing of the attenuator to the next step.

2. A peak-reading digital voltmeter for indicating the peak amplitude of an input signal comprising a counter producing a carry output signal when the counter exceeds its maximum count, a digital-to-analog converter coupled to the counter, an amplitude comparator coupled to the output of the converter, step-attenuator means coupling the input signal to the comparator, a gated oscillator coupled to the counter for stepping the counter, the gated oscillator being coupled to the output of the comparator circuit, the oscillator being gated on whenever the signal amplitude derived from the step-attenuator is greater than the signal amplitude from the converter and gated off by the comparator when the signal amplitude derived from the step-attenuator is smaller than the signal amplitude from the converter, a ring counter, means for advancing the ring counter in response to the carry output from the counter, means for setting the step-attenuator to a predetermined attenuation setting for each setting of the ring counter, and means responsive to the setting of the ring counter for pre-setting the counter to a selected count condition following the generation of a carry signal.

3. A peak-reading digital voltmeter for indicating the peak amplitude of an input signal comprising a counter producing a carry output signal when the counter exceeds its maximum count, a digital-to-analog converter coupled to the counter, an amplitude comparator coupled to the output of the converter, step-attenuator means coupling the input signal to the comparator, a gated oscillator coupled to the counter for stepping the counter, the gated oscillator being coupled to the output of the comparator circuit, the oscillator being gated on whenever the signal amplitude derived from the step-attenuator is greater than the signal amplitude from the converter and gated off by the comparator when the signal amplitude derived from the step-attenuator is smaller than the signal amplitude from the converter, stepping means actuated by the carry output of the counter, said stepping means setting the step-attenuator to increase the attenuation of the input signal with each carry produced by the counter, means for pre-setting the counter to a count condition bearing the same ratio to the total count of the counter as the attenuation ratio introduced by the attenuator.

4. A peak-reading digital voltmeter for indicating the peak amplitude of an input signal comprising a counter producing a carry output signal when the counter exceeds its maximum count, a digital-to-analog converter coupled to the counter, an amplitude comparator coupled to the output of the converter, step-attenuator means coupling the input signal to the comparator, means for advancing the counter whenever the signal amplitude derived from the step-attenuator is greater than the signal amplitude from the converter, a ring counter, means for advancing the ring counter in response to the carry output from the counter, relay means for setting the step-attenuator to a predetermined attenuation setting for each setting of the ring counter, means responsive to the setting of the ring counter for pre-setting the counter to a selected count condition following the generation of a carry signal, and means responsive to the output of the amplitude comparator for advancing the setting of the ring counter when the output of the step-attenuator exceeds the output of the converter by an amount greater than the attenuation produced by the advancing of the attenuation to the next step.

5. A peak-reading digital voltmeter for indicating the peak amplitude of an input signal comprising a counter producing a carry output signal when the counter exceeds its maximum count, a digital-to-analog converter coupled to the counter, an amplitude comparator coupled to the output of the converter, step-attenuator means coupling the input signal to the comparator, means for advancing the counter whenever the signal amplitude derived from the step-attenuator is greater than the signal amplitude from the converter, stepping means actuated by the carry output of the counter, said stepping means setting the step-attenuator to increase the attentuation of the input signal with each carry produced by the counter, means for pre-setting the counter to a count condition bearing the same ratio to the total count of the counter as the attenuation ratio introduced by the attenuator.

6. A peak digitizer for indicating in digital form the peak amplitude of a measured input signal, comprising a pulse source, a counter stepped in response to the pulse source, the counter generating a carry when it is counted through its maximum count, means for converting the count condition of the counter to a corresponding voltage output level, means having a pair of inputs for comparing said voltage output level and an input signal to be measured and providing an output indication to actuate said pulse source for counting up the counter only when the relative magnitude of the input signal is greater than said output level, means for coupling the output of the converting means to one of the pair of inputs for the comparing means, means for coupling the input signal to be measured to the other of said pair of inputs, means for adjusting the relative magnitude of the signals in large incremental steps coupled in one of said pair of inputs, means for actuating said adjusting means in response to a carry generated by the counter, means responsive to the carry from the counter for setting the counter to a predetermined count condition when the count is counted through its maximum count, and means responsive to the output voltage level of said comparing means for actuating said adjusting means when the relative magnitude of the signals applied thereto exceeds the incremental voltage step produced by said adjusting means.

7. A peak digitizer for indicating in digital form the peak amplitude of a measured input signal, comprising a pulse source, a counter stepped in response to the pulse source, the counter generating a carry when it is counted through its maximum count capacity, means for converting the count condition of the counter to a corresponding voltage output level, means having a pair of inputs for comparing said voltage output level and an input signal to be measured and providing an output indication to actuate said pulse source for counting up the counter only when the relative magnitude of the input signal is greater than said voltage output level, means for coupling the output of the converting means to one of said pair of inputs, means for coupling the input signal to be measured to the other of said pair of inputs, means for adjusting the relative magnitude of the signals in large incremental steps coupled in one of said pair of inputs, and means for actuating said adjusting means in response to a carry generated by the counter.

8. A peak digitizer for providing a digital indication of the peak amplitude of a measured input voltage, comprising a pulse source, a counter stepped in response to pulses from said source, the counter being adapted to generate an overflow pulse and to recycle when the number of pulses exceeds the maximum count capacity of the counter, means for converting the count condition of the counter to a corresponding voltage output level, means responsive to an input voltage for starting and stopping the stepping of the counter by the pulse source when the relative magnitude of the input voltage rises above and drops below said output level, respectively, comparator means having a pair of inputs for producing an output voltage poportional to the relative magnitude of the voltages at the two inputs, the output of the comparator means being coupled to the input of said starting and stopping means and the two inputs being coupled respectively to the output of the converting means and the measured input voltage, step-attenuating means for attenuating the input voltage in large incremental steps, means responsive to the overflow pulse for stepping the attenuating means to the next attenuation step, means responsive to the overflow pulse for presetting the counter to a predetermined count condition, and means for stepping the attenuating means when the comparing means indicates the relative levels of the input signal and output of the converter differ by an amount greater than can be compensated for by the next step of the attenuating means.

9. A peak digitizer for providing a digital indication of the peak amplitude of a measured input voltage, comprising a pulse source, a counter stepped in response to pulses from said source, the counter being adapted to generate an overflow pulse and to recycle when the number of pulses exceeds the maximum count capacity of the counter, means for converting the count condition of the counter to a corresponding voltage output level, means responsive to an input voltage for starting and stopping the stepping of the counter by the pulse source when the relative magnitude of the input voltage is greater and less than said output level, respectively, comparator means having a pair of inputs for producing an output voltage proportional to the relative magnitude of the voltages at the two inputs, the output of the comparator means being coupled to the input of said starting and stopping means and the two inputs being coupled respectively to the output of the converting means and the measured input voltage, step-attenuating means for attenuating the input voltage in large incremental steps, means responsive to the overflow pulse for stepping the attenuator to the next attenuation step, and means responsive to the overflow pulse for presetting the counter to a predetermined count condition.

References Cited in the file of this patent

UNITED STATES PATENTS

| | | |
|---|---|---|
| 2,717,994 | Dickinson | Sept. 13, 1955 |
| 2,761,968 | Kuder | Sept. 4, 1956 |
| 2,824,285 | Hunt | Feb. 18, 1958 |
| 2,870,408 | Draganjac | Jan. 20, 1959 |